United States Patent
Hu et al.

(10) Patent No.: US 6,497,851 B1
(45) Date of Patent: Dec. 24, 2002

(54) ENGINE EXHAUST TREATMENT APPARATUS AND METHOD OF USE

(75) Inventors: Zhicheng Hu, Edison, NJ (US); Ronald M. Heck, Frenchtown, NJ (US); Rudolf M. Smaling, Plainfield, NJ (US); Alan R. Amundsen, Somerville, NJ (US)

(73) Assignee: Englehard Corporation, Iselin, NJ (US)

( * ) Notice: Subject to any disclaimer, the term of this patent is extended or adjusted under 35 U.S.C. 154(b) by 0 days.

(21) Appl. No.: 08/576,198

(22) Filed: Dec. 21, 1995

Related U.S. Application Data

(63) Continuation-in-part of application No. 08/350,297, filed on Dec. 6, 1994.

(51) Int. Cl.$^7$ ................................. F01N 3/10
(52) U.S. Cl. .................. 423/213.5; 423/213.7; 60/299; 60/302; 422/171; 422/177
(58) Field of Search ............... 423/213.7, 213.5; 422/171, 177; 60/299, 302

(56) References Cited

U.S. PATENT DOCUMENTS

| | | | | |
|---|---|---|---|---|
| 3,540,838 A | * | 11/1970 | Reitmeier | 423/213.5 |
| 3,803,839 A | * | 4/1974 | Santiago | 423/213.7 |
| 3,896,616 A | | 7/1975 | Keith et al. | 60/274 |
| 4,171,288 A | | 10/1979 | Keith et al. | 252/462 |
| 4,374,103 A | * | 2/1983 | Gandhi et al. | 423/213.5 |
| 4,448,756 A | * | 5/1984 | Hammerle et al. | 423/213.7 |
| 4,504,598 A | | 3/1985 | Ono et al. | 502/303 |
| 4,624,940 A | | 11/1986 | Wan et al. | 502/251 |
| 4,714,694 A | | 12/1987 | Wan et al. | 502/304 |
| 4,727,052 A | | 2/1988 | Wan et al. | 502/327 |
| 5,057,483 A | | 10/1991 | Wan | 502/304 |
| 5,106,588 A | | 4/1992 | Sims et al. | 422/180 |
| 5,116,800 A | * | 5/1992 | Williamson et al. | 423/213.5 |
| 5,212,142 A | | 5/1993 | Dettling | 502/304 |
| 5,248,650 A | * | 9/1993 | Sekiba et al. | 423/213.5 |
| 5,260,249 A | * | 11/1993 | Shiraishi et al. | 423/213.5 |
| 5,510,086 A | * | 4/1996 | Hemingway et al. | 422/171 |
| 5,525,307 A | * | 6/1996 | Yasaki et al. | 422/171 |

FOREIGN PATENT DOCUMENTS

| | | | |
|---|---|---|---|
| EP | 0 387 611 | 9/1990 | |
| EP | 0 399 892 | 11/1990 | |
| EP | 0 460 542 A2 | 12/1991 | |
| EP | 0 613 714 A2 | 9/1994 | |
| FR | 2 328 512 | 5/1977 | B01J/23/86 |
| WO | WO 96/17671 | 6/1996 | B01D/53/94 |

OTHER PUBLICATIONS

SAE 922338 Distribution of Warm–Up and Underfloor Catalyst Volumes, Ball, D.J. (1992).
SAE 93054 Novel Catalyst for Treating Exhaust Gases for Internal Combustion and Stationary Source Engines, Bhasin, M. (1993).
SAE 932765 A Warm–up and Underfloor Converter Parametric Study, Ball, D.J. (1993).
SAE 960796 The Development of a Close Coupled Plus Underfloor Catalyst for a ULEV Application, Chen, S.F., Amundsen, A.R., Rabinowitz, H.N., Yamada, T., (1992).

* cited by examiner

*Primary Examiner*—Stanley S. Silverman
*Assistant Examiner*—Maribel Medina
(74) *Attorney, Agent, or Firm*—Richard A. Negin

(57) ABSTRACT

An exhaust gas treatment apparatus and method for its use includes an upstream catalyst and a downstream catalyst. The upstream catalyst contains a catalytic metal effective at least for the oxidation of hydrocarbons in the exhaust gas stream, and preferably contains a palladium catalytic component and contains substantially no oxygen storage components, i.e., oxides of cerium, cobalt, iron, magnesium, molybdenum, nickel, praseodymium, tungsten and vanadium, but the downstream catalyst includes an oxygen storage component. Preferably, the upstream catalyst is a close-coupled catalyst. The downstream catalyst may be an underfloor catalyst or a close-coupled catalyst, in which case there is, preferably, an additional, underfloor catalyst.

28 Claims, 2 Drawing Sheets

ENGINE EXHAUST TREATMENT APPARATUS AND METHOD OF USE

This application is a continuation-in-part of U.S. patent application Ser. No. 08/350,297, filed Dec. 6, 1994.

BACKGROUND OF THE INVENTION

1. Field of the Invention

The present invention relates to apparatus for and a method of treating engine exhaust gases to reduce pollutants contained therein. More specifically, the present invention concerns apparatus containing catalysts of two different types, one of which may be a "close-coupled catalyst" which is free of an oxygen storage component.

2. Related Art

Motor vehicle exhaust treatment devices such as catalytic converters have conventionally been located in an underfloor position in the vehicles. However, by the time engine exhaust gases travel through an exhaust pipe to an underfloor position, they cool significantly relative to the temperature at or near the engine outlet, so there is a significant period of low conversion activity before the exhaust gases heat the catalyst to its light-off temperature. Accordingly, during the cold-start period of engine operation there is a significant discharge of unconverted exhaust gas. Increasingly stringent governmental emissions standards require, however, that cold-start emissions be reduced. In particular, the California Resource Board (CARB) has announced new ultra-low emission vehicle standards that will prohibit vehicle emissions above 0.04 grams of non-methane hydrocarbons per mile, 1.7 grams carbon monoxide per mile and 0.2 grams $NO_x$ per mile. For most motor vehicles, a large portion (up to 80%) of the hydrocarbon emissions occurs during the first phase of the U.S. Federal Test Procedure ("FTP"), which encompasses the cold-start period of engine operation, and which requires simulation of cold-start, warm-up, acceleration, cruise, deceleration and similar engine operating modes over a specified time period. A variety of technologies are under development to reduce cold-start hydrocarbon emissions, including the use of close-coupled catalysts as disclosed, e.g., in Ball, D. J., "Distribution of Warm-Up and Underfloor Catalyst Volumes", SAE 922338. It has been reported that close-coupled catalysts, especially Pd-containing catalysts, are effective for reducing HC emissions during cold-start of the FTP cycle.

The principal function of close-coupled catalysts, also referred to as "precat" and "warm-up" catalysts, is to reduce hydrocarbon emissions during cold-start. Cold-start is the period immediately after starting the engine from ambient conditions. The length of the cold-start period depends on the ambient temperature, the type of engine, the engine control system and engine operation. Typically, the cold-start period is within the first two minutes after the start of an engine at ambient temperature. FTP Test 1975 characterizes cold-start as the first bag (i.e., exhaust gas sample) of the FTP driving cycle which lasts for the first 505 seconds after starting an engine at ambient temperature, which is generally considered to be 25° C. In an exhaust apparatus comprising a close-coupled catalyst, at least part of the total exhaust system catalyst is positioned closer to the engine than a traditional "underfloor catalyst". Specifically, the close-coupled catalyst is located in the engine compartment, i.e., beneath the hood and adjacent to the exhaust manifold. The close-coupled catalyst can constitute the entire catalyst mass of the exhaust treatment apparatus or it can be used in conjunction with an underfloor catalyst. The design option depends on the engine configuration, size and space available. Due to its proximity to the engine relative to the underfloor catalyst, the close-coupled catalyst receives exhaust gas at a higher temperature than the underfloor catalyst. Accordingly, the close-coupled catalyst attains its light-off temperature more quickly than an underfloor catalyst and therefore reduces emissions earlier relative to the cold-start period. On the other hand, a catalyst in a close-coupled position receives exhaust gas at operating temperatures, i.e., post-cold-start period temperatures, higher than those at which an underfloor catalyst receives the exhaust gas. As a consequence, the close-coupled catalyst must have high temperature stability, as discussed in Bhasin, M. et al, "Novel Catalyst for Treating Exhaust Gases For Internal Combustion and Stationary Source Engines", SAE 93054, 1993.

A typical underfloor motor vehicle catalyst is a three-way conversion catalyst ("TWC") which catalyzes the oxidation of the unburned hydrocarbons and carbon monoxide and the reduction of nitrogen oxides to nitrogen. TWC catalysts, which exhibit good activity and long life, typically comprise one or more platinum group metals (e.g., platinum or palladium, rhodium, ruthenium and iridium), optionally with one or more base metals, dispersed on a high-surface area, refractory oxide support, e.g., particles of high-surface area alumina, to form a catalytic material. The catalytic material is carried on a suitable carrier or substrate such as a monolithic carrier comprising a refractory ceramic or metal honeycomb structure, or refractory particles such as spheres or short, extruded segments of a suitable refractory material. High-surface area alumina support materials, also referred to as "gamma-alumina" (although it usually contains other phases of alumina in addition to gamma) or "activated alumina", typically exhibit a BET surface area in excess of 60 square meters per gram ("$m^2/g$"), often up to about 200 $m^2/g$ or more. It is known to utilize refractory metal oxides other than activated alumina as a support for at least some of the catalytic components in a given catalyst. For example, bulk cerium oxide, zirconium oxide, alpha-alumina and other materials are known for such use. Many of these other materials suffer from the disadvantage of having a considerably lower BET surface area than activated alumina, but that disadvantage tends to be offset by a greater durability of the resulting catalyst.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconium oxide, titanium oxide, alkaline earth metal oxides such as barium oxide, calcium oxide or strontium oxide or rare earth metal oxides, such as cerium oxide, lanthanum oxide and mixtures of two or more rare earth metal oxides. For example, see C. D. Keith et al U.S. Pat. No. 4,171,288.

U.S. Pat. No. 4,504,598 discloses a process for producing a high temperature-resistant TWC catalyst. The process includes forming an aqueous slurry of particles of activated or gamma-alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

SUMMARY OF THE INVENTION

The present invention relates to an engine exhaust treatment apparatus for abating pollutants contained in the exhaust stream of the engine. The apparatus defines a flow path for the exhaust and comprises an upstream catalyst member comprising an upstream catalytic material effective for catalyzing the oxidation of hydrocarbons and comprising a platinum group metal component dispersed on a refractory metal oxide first support. The upstream catalytic material is substantially free of oxygen storage component. There is also a downstream catalyst member comprising a downstream catalytic material which is effective at least for the oxidation of hydrocarbons and which comprises one or more catalytic metal components dispersed on a refractory metal oxide support and an oxygen storage components.

According to one aspect of the invention, the upstream catalyst member may comprise a first close-coupled catalyst member and the platinum group metal component thereof may comprise a palladium component. Optionally, the upstream catalytic material may be substantially free of rhodium. However, the downstream catalytic material optionally comprises rhodium.

The downstream catalyst member may comprise an underfloor catalyst member or a second close-coupled catalyst member that may comprise a palladium component and an oxygen storage component. There may be both a second close-coupled catalyst member and an underfloor catalyst member. An underfloor catalyst member preferably comprises a three-way catalytic material.

According to one aspect of the invention, the first close-coupled catalyst member and the second close-coupled catalyst member may have different cross-sectional dimensions and may be disposed in separate canisters. Alternatively, the first close-coupled catalyst member and the second close-coupled catalyst member have like cross-sectional dimensions and may be disposed within the same canister.

According to another aspect of the invention, the first and the second catalyst members may each comprise a catalytic material comprising palladium and the underfloor catalytic material may comprise a catalytic material comprising rhodium.

Optionally, the upstream catalytic material may comprise at least one rare earth metal oxide selected from the group consisting of neodymium oxide and lanthanum oxide.

An engine exhaust treatment apparatus according to the present invention may comprise (a) a first close-coupled, catalyst member comprising a first catalytic material effective for catalyzing the oxidation of hydrocarbons and comprising a palladium catalytic component dispersed on a refractory metal oxide first support, the first catalytic material being substantially free of rhodium and oxygen storage components; (b) a second closed-coupled catalyst member comprising a second catalytic material effective at least for the oxidation of hydrocarbons; and (c) an underfloor catalyst member comprising a third catalytic material effective for three-way abatement of pollutants. At least one of the second close-coupled downstream catalyst member and the underfloor member may comprise an oxygen storage component. The first catalytic material may comprise at least one of an alkaline earth metal oxide, a rare earth metal oxide other than cerium oxide or praseodymium oxide, and zirconium oxide.

In various embodiments, the first close-coupled catalyst member may comprise from about 0.5 to about 3.5 $g/in^3$ of activated alumina and at least about 50 $g/ft^3$ of palladium component calculated as palladium metal and from about 0.05 to about 0.5 $g/in^3$ of the at least one alkaline earth metal component, calculated as the oxide. Optionally, the first close-coupled catalyst member may comprise from about 0.05 $g/in^3$ to about 0.4 $g/in^3$ of strontium oxide; not more than about 0.5 $g/in^3$ of zirconium oxide incorporated into the support material; and not more than about 0.5 $g/in^3$ of at least one rare earth metal oxide selected from the group consisting of lanthanum oxide and neodymium oxide.

The first close-coupled catalyst member may comprise at least 60 $g/ft^3$ of a platinum group metal component, e.g., from about 75 to 300 $g/ft^3$, and the platinum group metal component may principally comprise a palladium component.

In various embodiments, the first close-coupled catalyst member may comprise from about 0.75 to about 2.0 $g/in^3$ of activated alumina support material; and at least one component selected from the group consisting of from about 0.05 to about 0.4 $g/in^3$ of strontium oxide; from about 0.05 to about 0.2 $g/in^3$ of barium oxide; from about 0.025 to about 0.3 $g/in^3$ of lanthanum oxide; from about 0.025 to about 0.3 $g/in^3$ of neodymium oxide; and from about 0.05 to about 0.5 $g/in^3$ of zirconium oxide.

In a particular embodiment an exhaust treatment apparatus of the present invention may comprise a first close-coupled catalyst member comprising about 300 $g/ft^3$ palladium, 1.23 $g/in^3$ alumina, 0.19 $g/in^3$ lanthanum oxide, 0.1 $g/in^3$ zirconium oxide, 0.1 $g/in^3$ strontium oxide and 0.16 $g/in^3$ neodymiun oxide. The apparatus may further comprise a second close-coupled catalyst member comprising about 110 $g/ft^3$ palladium, 1.4 $g/ft^3$, 1.4 $g/in^3$ alumina, 0.8 $g/in^3$ cerium oxide, 0.5 $g/in^3$ cerium oxide-zirconium oxide composite, 0.24 $g/in^3$ zirconium oxide, 0.2 $g/in^3$ lanthanum oxide, 0.1 $g/in^3$ neodymium oxide, 0.1 $g/in^3$ strontium oxide, 0.07 $g/in^3$ nickel oxide and 0.06 $g/in^3$ barium oxide. There may also be an underfloor catalyst comprising about 91.9 $g/ft^3$ palladium, 6.56 $g/ft^3$ rhodium, 6.56 $g/ft^3$ platinum, 1.5 $g/in^3$ alumina, 1.7 $g/in^3$ cerium oxide-zirconium oxide composite, 0.1 $g/in^3$ neodymium oxide, 0.25 $g/in^3$ strontium oxide, 0.125 $g/in^3$ zirconium oxide, and 0.075 $g/in^3$ lanthanum oxide.

The present invention also relates to a method for treating the exhaust gas from an engine having an exhaust gas outlet. The method comprises flowing the exhaust gas from the exhaust gas outlet of the engine through an exhaust gas treatment apparatus as defined above. The method may comprise converting at least 10% of the carbon monoxide in the exhaust gas at the at least one downstream catalyst. By way of example, the method may comprise converting at least 25%, or at least 30%, or at least 40%, of the carbon monoxide in the exhaust gas at the at least one downstream catalyst.

As used herein and in the claims, the term "oxygen storage component" refers to multivalent, reducible transition metal oxides of the type which is believed to be capable of taking up oxygen from an exhaust stream during relatively oxygen-rich periods and releasing oxygen into the gas stream during relatively oxygen-poor periods. Such oxygen storage components include oxides of cerium, cobalt, iron, molybdenum, nickel, praseodymium, tungsten and vanadium. As used herein and in the claims the term "oxygen storage component" does not pertain to any form, including oxides, of platinum group metals or to neodymium oxide or lanthanum oxide.

As used herein and in the claims, the term "close-coupled", as it pertains to a catalyst member or to a canister containing a catalyst member, refers to a position in the flow path defined by the exhaust apparatus in which, during steady state medium or high load engine operating conditions the exhaust is at a temperature of at least about 600° C. upon initial contact with the catalyst. Typically, a close-coupled catalyst is located in the engine compartment of a motor vehicle, and is disposed in the exhaust flow path close to the exhaust outlet of the engine, for example, within about twelve inches or less from the exhaust manifold outlet along the flow path of the exhaust gas, so that the exhaust gas does not cool significantly before it comes into contact with the catalyst. Optionally, a close-coupled catalyst may be positioned at or within the exhaust manifold. Consequently, the inlet exhaust to the close-coupled catalyst is usually at a temperature of from about 600° to 1000° C., more usually from about 6000 to 800° C. Optionally, a close-coupled catalyst may be positioned in the exhaust manifold itself. The term "underfloor" as it pertains to a catalyst means a catalyst which is positioned in the exhaust apparatus downstream of an upstream catalyst and which, under steady state engine operating conditions, receives exhaust gas at temperatures lower than about 600° C., usually at from about 200° to 600° C., more usually from about 300° to 550° C. Typically, an underfloor catalyst is positioned beneath the floor board of a vehicle and outside the engine compartment, although it need not necessarily be so positioned.

Reference herein and in the claims to the quantity ("loading") of particular components of a catalyst member or catalytic material are expressed as either grams per cubic foot ("g/ft$^3$") or grams per cubic inch ("g/in$^3$"). These weight per unit volume units are employed to accommodate the voids provided by the gas flow passages of a "carrier member" which, as used herein and in the claims, means a body having a plurality of gas flow passages extending therethrough and on which a coating of the catalytic material is disposed. Typical carrier members are described below. The type which has a plurality of parallel gas flow passages formed therein are sometimes below referred to as "honeycomb-type" carriers.

DETAILED DESCRIPTION OF THE INVENTION AND PREFERRED EMBODIMENTS THEREOF

Figure 1:
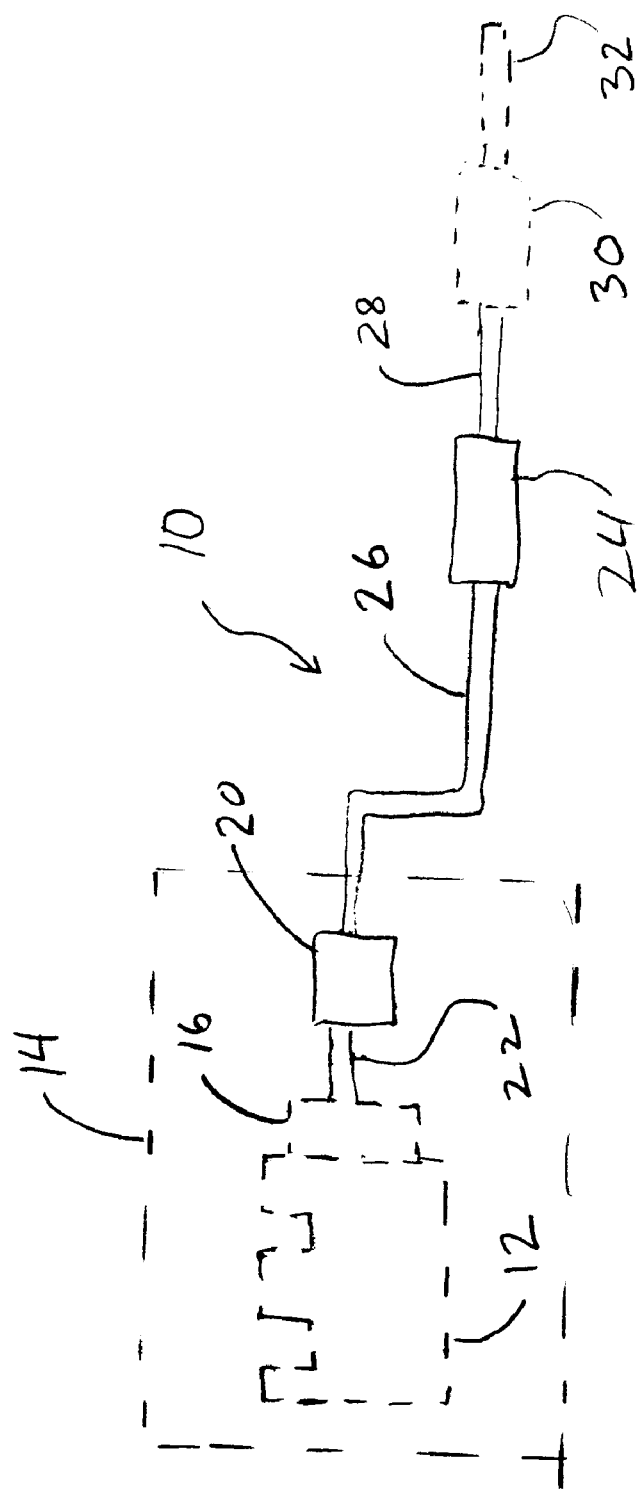
FIG. 1 is a schematic representation of one configuration of an exhaust gas treatment apparatus comprising in accordance with one embodiment of the present invention.

An exhaust treatment apparatus in general accordance with the present invention comprises at least two catalyst members in the flow path of the exhaust gas from a hydrocarbon fuel-driven spark ignition engine. Each catalyst member comprises a catalytic material effective to convert noxious components of the exhaust gas to innocuous substances. One catalyst member is upstream from at least one other catalyst member, and the most upstream of the catalyst members comprises a catalytic material that is substantially free of oxygen storage components.

By excluding oxygen storage components from the upstream catalyst in accordance with the present invention, the rate of conversion of CO to $CO_2$ in the upstream catalyst is controlled, to enable CO to pass to a downstream catalyst. Reducing the amount of CO oxidation in the upstream or first catalyst member will result in lower operating temperature and greater durability of the upstream catalyst member. This is because the heat of CO oxidation would exacerbate the high-temperature conditions that prevail at the upstream position, where exhaust gas components are concentrated and the resultant exothermic catalytic activity can lead to over-temperature failure of the upstream catalyst member. The CO that passes to a downstream catalyst member will enhance the performance of the downstream catalyst member, which receives a pollutant-diminished exhaust gas stream which may be cooled by travel through the exhaust system pipes. Such enhancement occurs because the CO is easily oxidized at the downstream catalyst member, releasing its heat of oxidation to raise the downstream catalyst member to its light-off temperature more quickly than would be the case if the CO had been oxidized upstream, because some of the heat released upstream would have dissipated before reaching the downstream catalyst member. In addition, CO can act as a reductant for the catalytic reduction of $NO_x$ by the downstream catalyst member.

Preferably, the upstream catalyst member is a first close-coupled catalyst member, i.e., it is the first catalyst member which the exhaust encounters and is disposed in close proximity to the exhaust outlet of the engine and is therefore exposed to higher temperature exhaust gas than a conventional underfloor catalyst member. For example, the first, close-coupled catalyst member may be coupled in the exhaust flow path within about one foot from the outlet of the engine exhaust manifold. The first close-coupled upstream catalyst member comprises an "upstream" or first catalytic material, which is effective at least to oxidize hydrocarbons, is stable at high operating temperatures. The upstream catalytic material may also be effective for catalyzing the oxidation of carbon monoxide as well as the reduction of nitrogen oxides ("$NO_x$") at operating temperatures although such three-way conversion capability is not essential for the first close-coupled catalyst member.

The catalytic material of an upstream or first close-coupled catalyst comprises a-platinum group metal component that preferably comprises a palladium component, i.e., palladium in elemental metal form, oxide form, as an alloy or compound or in any other catalytically effective form, dispersed on a refractory inorganic oxide support material such as alumina, silica, titania and/or zirconium oxide. The catalytic material is deposited onto a suitable carrier, as is well-known in the art.

In addition to a palladium component, the platinum group metal component of the upstream or first close-coupled catalytic material may comprise one or more other platinum group metals selected from the group consisting of platinum, ruthenium and iridium, with the quantity of the palladium component exceeding the combined quantity of other platinum group metal components, as measured on the basis of the elemental metals. In other words, the platinum group metal component of the upstream catalytic material may principally comprise a palladium component.

Since the upstream catalyst member is exposed to such high temperatures, the platinum group metal component of the upstream catalytic material may optionally be substantially free of rhodium. Rhodium, which may be advantageously included in downstream catalytic materials to promote $NO_x$ reduction, would not be effective in the high temperature environment of the upstream catalyst member, and so may be omitted therefrom without significant loss in catalytic activity. Also, since rhodium is quite expensive, economic savings accrue when rhodium is not added to the upstream catalytic material.

The upstream or first catalytic material preferably further comprises at least one alkaline earth metal oxide and at least one of neodymium oxide and lanthanum oxide.

In a preferred embodiment, the upstream or first close-coupled catalytic material comprises a palladium component dispersed on an activated alumina support material, strontium oxide, neodymium oxide, lanthanum oxide and zirconium oxide.

Contrary to the teachings in the prior art that cerium oxide be included in a catalyst exposed to high temperatures, the first close-coupled catalyst, in accordance with the teachings of the present invention, comprises a catalytic material that is substantially free of, i.e., it contains not more than trace amounts of, oxygen storage components, including cerium oxide and praseodymium oxide. While lanthanum oxide is not considered to be an oxygen storage component, commercial grades of lanthanum oxide often contain minor proportions of cerium oxide therein as a contaminant. The quantity of cerium oxide introduced into the first catalytic material through the incorporation of lanthanum oxide is not expected to endow a significant oxygen storage capability to the catalyst. The amount of cerium oxide in such case will comprise less than about 5 percent of the catalytic material by weight. More typically, the oxygen storage component comprises less than 1 percent, preferably less than 0.5 percent, most preferably less than 0.1 percent by weight of the catalytic material. As explained above, by substantially excluding oxygen storage components in the first close-coupled catalyst, the longevity of the first close-coupled catalyst is enhanced and the conversion activity of the downstream catalyst may be enhanced as well. Further, excluding ceria as an oxygen-storage component in the upstream catalytic material avoids detrimental interaction between the ceria and palladium (which is the preferred upstream catalytic component) which can be exacerbated by high temperatures.

At a point downstream from the upstream or first close-coupled catalyst member the apparatus comprises at least one catalyst member which is effective at least for the oxidation of hydrocarbons and carbon monoxide, and which preferably comprises a three-way catalyst and an oxygen storage component. The downstream catalytic material also preferably comprises rhodium in an amount sufficient to promote the reduction of $NO_x$. The downstream catalyst member may be disposed in a close-coupled position downstream from the first close-coupled catalyst member. Alternatively, the downstream catalyst member may be in an underfloor position. There may be more than one catalyst member downstream from the upstream catalyst member, e.g., there may be both a downstream or second close-coupled catalyst member and an underfloor catalyst member. In such case, the second close-coupled catalyst member serves to enhance pollutant conversion performance at a point that facilitates monitoring of catalytic performance for purposes of California Air Resources Board ("CARB") regulations concerning on-board diagnostics ("OBD II") regulations. In addition, the activity of the second close-coupled catalyst member enhances the performance of the underfloor catalyst member by raising the temperature of the exhaust gas, thus accelerating the rate at which the underfloor catalyst member attains its operating temperature.

Any suitable three-way catalytic materials known in the art may be used for the downstream catalyst member(s). Such catalytic materials typically comprise a platinum group metal component comprising one or more metals selected from the group consisting of platinum, palladium, rhodium, ruthenium and iridium, e.g., dispersed on a refractory support material, e.g., one or more of activated alumina, silica, titania, silica-alumina, alumina-silicates, aluminum-zirconium oxide, alumina-chromia and alumina-cerium oxide.

Downstream catalytic compositions preferably comprise at least one alkaline earth metal oxide component such as magnesium, barium, calcium and strontium oxides, incorporated into the support material as stabilizers for the support material. Barium and strontium oxides are preferred. In addition, a downstream catalyst may include rare earth metal components, preferably lanthanum and neodymium components, which are believed to promote hydrocarbon oxidation and $NO_x$ reduction. Three-way catalytic materials useful in downstream catalyst members of the present invention are disclosed in U.S. Ser. No. 08/265,076 entitled, "Layered Catalyst Composite", the disclosure of which is hereby incorporated herein by reference. Briefly restated, application Ser. No. 08/265,076 describes a layered catalyst composition in two layers of catalytic material coated onto a carrier member. The first or bottom layer comprises a palladium component dispersed on a first support material, e.g., alumina, and a first oxygen storage component, e.g., ceria and/or praseodymia, in intimate contact with the palladium component, and the second or top layer comprises a palladium component. To establish intimate contact between the oxygen storage component and the palladium in the first layer, a solution containing a soluble precursor of the oxygen storage component, e.g., cerium nitrate, is impregnated into support particles bearing the palladium component. The impregnated support particles are then dried and calcined to remove the solvent and convert the precursor to the oxide form. There may be an oxygen storage component in the second layer, but not in intimate contact with the palladium component therein; rather, it is present, if at all, in bulk particulate form, intermixed with support particles bearing the palladium.

A downstream catalytic material of the present invention preferably contains an oxygen storage component, i.e., oxides of one or more of cerium, cobalt, iron, molybdenum, nickel, praseodymium, tungsten and vanadium, with the most preferred oxygen storage component being cerium oxide and praseodymium oxide. The oxygen storage component may be present in an amount of at least 5 weight percent, preferably at least 10 weight percent, and more preferably at least 15 weight percent of the catalytic material, calculated on a dry basis as the oxide. The oxygen storage component may be incorporated into the support particles or other particulate components of the catalytic material by methods known in the art, as described below. As stated above, the oxygen storage component takes up oxygen during oxygen rich periods and releases oxygen during oxygen poor periods, thus reducing fluctuations in oxidation conversion performance.

In addition to the above-listed components, a downstream catalytic material may contain bulk "co-formed" composites of zirconium oxide and at least one rare earth metal oxide.

Such materials, which may optionally be used as support materials, are disclosed, for example, in U.S. Pat. Nos. 4,624,940 and 5,057,483, both of which are hereby incorporated herein by reference. These patents teach that such composites may be formed by co-precipitation, by co-gelling, or by any other suitable technique in which the resultant product contains the rare earth metal oxide dispersed substantially throughout the entire zirconium oxide matrix in the finished product, and not merely on the surface of the zirconium oxide particles or only within a surface layer leaving a substantial core of the zirconium oxide matrix without rare earth metal oxide dispersed therein. One suitable technique is illustrated in the article by Luccini, E., Mariani, S., and Sbaizaro, O. (1989) "Preparation of Zirconia Cerium Carbonate in Water With Urea", *Int. J. of Materials and Products Technology*, Vol. 4, No. 2, pp. 167–175, the disclosure of which is hereby incorporated herein by reference. As disclosed, starting at page 169 of the article, a dilute (0.1 molar) distilled water solution of zirconyl chloride and cerium nitrate in proportions to promote a final product of $ZrO_2$–10 mole % $CeO_2$ is prepared with ammonium nitrate as a buffer to control pH. The solution was boiled with constant stirring for two hours and complete precipitation was attained with the pH not exceeding 6.5 at any stage. The co-precipitates may, after washing, be spray-dried or freeze-dried to remove water and then calcined in air at about 500° C. to form the co-formed rare earth metal oxidezironia support. Particularly preferred are particles comprising greater than 50 weight percent zirconium oxide and preferably from 60 to 90 weight percent zirconium oxide, from 10 to 30 weight percent cerium oxide and optionally from about 0.1 to about 10 weight percent of a non-cerium oxide rare earth metal oxide selected from the group consisting of yttria, lanthana and neodymia.

The composition of the downstream catalyst may include other conventional additives such as sulfide surpressants, e.g., nickel or iron components. If nickel oxide is used, an amount of from about 1% to 25% by weight of the first coat of catalytic material can be effective, as disclosed in commonly owned patent application Ser. No. 07/787,192, filed Nov. 4, 1991 and entitled "High Performance Thermally Stable Catalyst", now U.S. Pat. No. 5,212,142 issued May 18, 1993, which is hereby incorporated herein by reference. A catalytic material as described and claimed therein generally comprises (a) a first support comprising stabilized alumina, (b) a catalytically effective amount of a first platinum catalytic component dispersed on the first support, (c) a second support consisting essentially of a rare earth metal oxide, and (d) a catalytically effective amount of both a rhodium catalytic component and a palladium catalytic component dispersed on the second support, the rhodium and palladium catalytic components being present in quantities to provide in the cataltyic material a rhodium to palladium weight ratio of from about 50:1 to 1:50; measured as metals. An underfloor catalyst member for use in the present invention may advantageously comprise a rhodium component which, at the relatively low temperatures that prevail at the underfloor position, will be able to provide $NO_x$ reduction activity when a close-coupled catalyst would be at a temperature that would inactivate rhodium from its $NO_x$ reduction activity.

When tested according to FTP 1975, less than 90, preferably less than 75, more preferably less than 70, and most preferably less than 60 mole percent of the carbon monoxide initially (pre-catalytic treatment) contained in the exhaust is oxidized in the upstream or first close-coupled catalyst. Stated another way, when tested according to the FTP 1975 test, at least 10, preferably at least 25, more preferably at least 30, and most preferably at least 40 mole percent of the initial content of carbon monoxide is not oxidized in the upstream catalyst and will pass from the upstream catalyst to a downstream catalyst.

In preparing a catalytic material, a suitable compound and/or complex of any catalytic component, e.g., the platinum group metals, may be utilized to achieve dispersion of the component onto the bulk support material. As used herein, the term "compound", as in "platinum group metal compound" means any compound, complex, or the like which, upon calcination or use of the catalyst, decomposes or otherwise converts to a catalytically active form, which is usually the metal oxide. Water-soluble compounds or water-dispersible compounds or complexes of one or more catalytic components may be utilized as long as the liquid used to impregnate or deposit the catalytic compounds onto the support material does not adversely react with other components of the catalytic metal, and is capable of being removed from the catalyst by volatilization or decomposition upon heating and/or the application of a vacuum. In some cases, the completion of removal of the liquid (which may be present as, e.g., water of crystallization) may not occur until the catalyst is placed into use and subjected to the high temperatures encountered during operation. Generally, both from the point of view of economics and environmental aspects, aqueous solutions of soluble compounds or complexes are preferred. For example, suitable water-soluble platinum group metal compounds are chloroplatinic acid, amine solubilized platinum hydroxide, rhodium chloride, rhodium nitrate, hexamine rhodium chloride, palladium nitrate or palladium chloride, etc. The compound-containing liquid is impregnated into the pores of the bulk support particles of the catalyst, and the impregnated material is dried and preferably calcined to bind the platinum group metal into the support material. During the calcination step, or at least during the initial phase of use of the catalyst, such compounds are converted into a catalytically active form of the platinum group metal or a compound thereof. An analogous approach can be taken to incorporate the other components into the catalytic material. For example, the oxygen storage component can be incorporated into the platinum group metal-containing refractory oxide support in the form of an aqueous solution. Examples of water-soluble, decomposable oxygen storage components which can be used for this purpose include, but are not limited to, cerium acetate, praseodymium acetate, cerium nitrate, praseodymium nitrate, etc. The impregnated material is then dried and calcined in air to give a first layer which contains an oxide of the oxygen storage component in intimate contact with the platinum group metal.

The oxygen storage component may be incorporated into the catalytic material in bulk form. By "bulk form" is meant that the cerium oxide and/or praseodymium oxide is present as discrete particles which may be as small as 1 to 15 microns in diameter or smaller and which are admixed with particles of the support material, as described in U.S. Pat. Nos. 4,714,694 and 4,727,052, both of which are hereby incorporated herein by reference. These patents illustrate that particles of cerium oxide may be admixed with particles of activated alumina so that the cerium oxide is present in solid or bulk form as opposed to, for example, impregnating alumina particles with a solution of cerium oxide compound which upon calcination is converted to cerium oxide disposed within the alumina particles.

The catalytic materials are typically used in particulate form with particles in the micron-sized range, e.g., 10 to 20 microns in diameter, so that they can be formed into a slurry and applied as a washcoat on a carrier member, as is well-known in the art. Any suitable carrier member may be employed, such as a honeycomb-type carrier of the type having a plurality of fine, parallel gas-flow passages extending therethrough from an inlet or an outlet face of the carrier, so that the passages are open to fluid-flow therethrough. The passages, which are typically essentially straight from their fluid inlet to their fluid outlet, are defined by walls on which the catalytic material is coated as a "washcoat" so that the gases flowing through the passages contact the catalytic material. The flow passages of the carrier member are thin-walled channels which can be of any suitable cross-sectional shape and size such as trapezoidal, rectangular, square, sinusoidal, hexagonal, oval, or circular. Such structures may contain from about 60 to about 700 or more gas inlet openings ("cells") per square inch of cross section ("cpsi"), more typically 200 to 400 cpsi. Such honeycomb-type carrier may be made of any suitable refractory material, for example, it may be formed from a ceramic-like material such as cordierite, cordierite-alpha-alumina, silicon nitride, zirconium mullite, spodumene, alumina-silica magnesia, zirconium silicate, sillimanite, magnesium silicates, zirconium oxide, petalite, alpha-alumina and alumino-silicates. Alternatively, a honeycomb-type carrier may be made of a refractory metal such as a stainless steel or other suitable iron-based, corrosion-resistant alloys. The coated carrier is disposed in a canister configured to protect the catalyst member, to facilitate establishment of a gas flow path through the catalyst member, as is known in the art.

When deposited as a washcoat onto a honeycomb-type carrier, the amounts of the various catalytic components of the catalytic material are often presented based on grams per volume basis, e.g., grams per cubic foot ($g/ft^3$) for platinum group metal components and grams per cubic inch ($g/in^3$) for catalytic materials generally, as these measures accommodate different gas-flow passage cell sizes in different honeycomb-type carrier substrates. For typical automotive exhaust gas catalytic converters, the catalyst member generally comprises from about 0.5 to about 6 $g/in^3$, preferably from about 1 to about 5 $g/in^3$ of catalytic material washcoat on the carrier. A typical down-stream catalytic material for use with the present invention may comprise platinum, palladium and rhodium in proportions of 1:14:1 in a total platinum group metal loading of 3.76 $g/ft^3$. Preferred amounts of the various components for the upstream catalyst member are, at least about 50 $g/ft^3$, e.g., from about 50 to about 400 $g/ft^3$, preferably 75 to 400 $g/ft^3$ of palladium component, from 0 to 20 $g/ft^3$ of platinum group metal components selected from the group consisting of rhodium, ruthenium and iridium components, and from 0 to 60 $g/ft^3$ of a platinum component, all calculated as the metals. To attain the desired oxidation of hydrocarbon and controlled oxidation of carbon monoxide, the amount of palladium should exceed the amount of other platinum group metals in the catalytic material. Activated alumina, the preferred support material, is present in a quantity of preferably from 0.5 to about 3.5 $g/in^3$ with zirconium oxide stabilizer incorporated therein in an amount of up to about 0.5 $g/in^3$ and preferably 0.05 to 0.2 $g/in^3$. The amount of the alkaline earth metal component is from about 0 to 0.6 $g/in^3$ and preferably from about 0.05 to about 0.5 $g/in^3$, calculated as the oxide. The amount of the rare earth metal component is preferably from 0.0 to 0.6 $g/in^3$ and more preferably 0.05 to 0.5 $g/in^3$, calculated as the oxide, lanthanum and neodymium oxides being preferred. Catalytic material is typically coated on a carrier member at a loading of from about 0.5 to about 6 $g/in^3$.

The volume of the first close-coupled catalyst member, i.e., the volume occupied by the catalytic material-bearing flow-through carrier, may be about 10 to 30 percent of the total engine cylinder volume that produces the exhaust gas received by the catalyst member. Generally, the volume of the first close-coupled catalyst member constitutes from about one-twentieth to about one-half of the total catalyst volume of the apparatus. For example, when the apparatus comprises only two catalyst members, e.g., only a first and, the first close-coupled catalyst member has a volume that is about one-fifth that of the second close-coupled catalyst member.

When an exhaust gas treatment apparatus in accordance with the present invention comprises first and second close-coupled catalyst members and an underfloor catalyst member, the volume of the first close-coupled catalyst member is preferably about one-half of that of the second close-coupled catalyst member, and the ratio of the total volume of the first and second catalyst members to that of the underfloor catalyst member is preferably from about 1:1 to 1:3.

Reference is made to FIG. 1 which schematically illustrates a particular configuration for an exhaust treatment apparatus of the present invention. FIG. 1 shows an exhaust treatment apparatus 10 for a gasoline engine 12 (shown in dotted outline) in an engine compartment 14 (indicated in dotted outline) of a motor vehicle (not shown). The gasoline engine 12 is equipped with an engine exhaust manifold 16 which collects exhaust gases from the engine's cylinders and directs the gases to a common manifold outlet 18. Exhaust treatment apparatus 10 comprises a close-coupled, upstream catalyst canister 20, which has an inlet where it receives exhaust gases from manifold 16 through a short pipe 22. Canister 20 houses at least one, preferably two catalyst members through which the exhaust gases flow. Due to the proximity of canister 20 to enginer 12, any catalyst member therein comprises a close-coupled catalyst. Apparatus 10 further comprises an underfloor downstream canister 24 connected to upstream canister 20 by exhaust pipe 26. Underfloor canister 24 contains a downstream catalyst member comprising a suitable three-way catalytic material as described above. Pipe 22, canister 20, pipe 26 and canister 24 together define part of a flow path for the exhaust gases flowing therethrough. The underfloor canister 24 is typically connected through a pipe 28 to muffler 30 (shown in dotted outline) which is not considered to be part of the treatment apparatus for purposes of the present invention. The muffler 30 is connected to tail pipe 32 having a tail pipe outlet 42 which opens to the environment.

Figure 2:
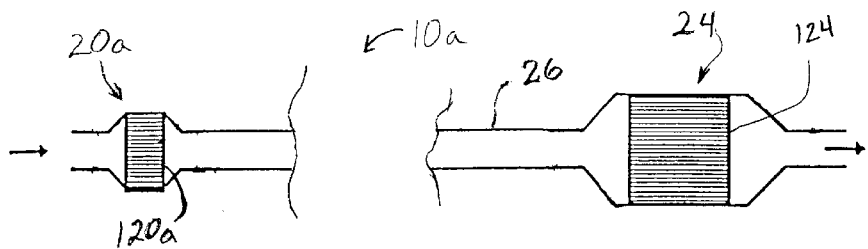
FIG. 2 is a schematic representation of an exhaust gas treatment apparatus in accordance with one embodiment of the present invention.

FIG. 2 shows a schematic drawing of a simple embodiment of an exhaust gas treatment apparatus 10a in accordance with the present invention. Apparatus 10a comprises a close-coupled upstream canister 20a in combination with underfloor downstream canister 24, to which it is connected through pipe 26. The close-coupled canister 20a contains a single close-coupled catalyst member 120a which comprises an upstream catalytic material that is substantially free of oxygen storage components. The underfloor canister 24 comprises a downstream catalyst member 124 which comprises a three-way catalytic material comprising an oxygen storage component.

Figure 3:
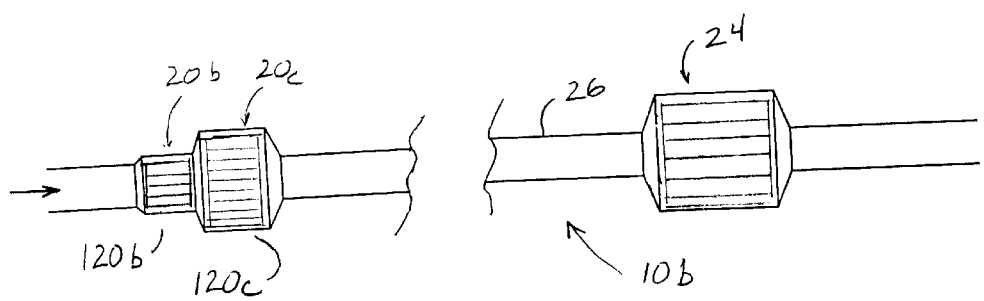
FIG. 3 is a schematic representation of an exhaust gas treatment apparatus in accordance with another embodiment of the present invention comprising a first and second close-coupled catalyst canisters that contain close-coupled members of different cross-sectional configuration.

A more preferred embodiment of the present invention is shown in FIG. 3. In this embodiment, apparatus 10b comprises two close-coupled canisters 20b and 20c, which contain a first close-coupled catalyst member 120b and a second close-coupled catalyst member 120c, respectively. Two canisters are employed to accommodate two close-coupled catalyst members that are different in diameter and/or cross-sectional configuration. For example, the first close-coupled catalyst member 120b may have a circular cross-sectional configuration while the second close-coupled catalyst member 120c has a racetrack cross-sectional configuration (i.e., two parallel sides separating two rounded sides). In a particular embodiment useful in connection with the exhaust from one manifold of a dual manifold medium duty truck, catalyst member 120b is cylindrical, 3 inches in diameter and 3 inches in length with 350 cpsi and 300 g/ft$^3$ of Pd; catalyst member 120c may have an elliptical configuration measuring 3.4 inches×5.0 inches×3.84 inches in length with a cell density of 350 cpsi and a Pd loading of 100 g/ft$^3$. The underfloor catalyst member in canister 24 could have a racetrack configuration measuring 3.18 inches×6.68 inches×5 inches, with a cell density of 350 cpsi and 100 g/ft$^3$ of platinum group metals in a Pt:Pd:Rh ratio of 1:14:1. To reduce the pressure drop in the exhaust gas stream flowing through the catalyst member, the carrier member may be configured to have thinner cell walls than a conventional carrier member.

Figure 4:
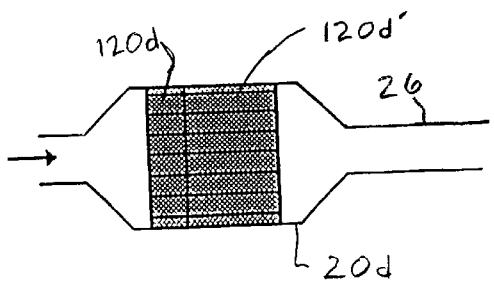
FIG. 4 is a schematic representation of a close-coupled catalyst canister containing first and second close-coupled catalyst members having like cross-sectional configurations, for use in an apparatus in accordance with yet another embodiment of the present invention.

FIG. 4 illustrates an alternative embodiment in which a close-coupled canister 20d contains two adjacent catalyst members, an upstream, first close-coupled catalyst member 120d and a downstream second close-coupled catalyst member 120d'. First closed-coupled catalyst member 120d comprises an oxygen storage component-free close-coupled catalytic material. Second close-coupled catalyst member 50 is disposed downstream from catalyst member 48 and preferably comprises a three-way catalytic material that includes an oxygen storage component. First and second close-coupled catalyst members 120d and 120d' are disposed immediately adjacent to each other and preferably have corresponding cross-sectional dimensions. Accordingly, they are conveniently disposed within a single canister. Adjacent catalyst members also preferably have the same cross-sectional gas flow passage densities.

The following Examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Seven hundred thirty-eight grams of gamma-alumina powder having a surface area of about 160 square meters per gram (160 m$^2$/g) were impregnated with an aqueous palladium nitrate solution containing 34.5 grams of palladium. The palladium-containing alumina and a zirconium acetate solution, in an amount sufficient to form 60.1 grams of $ZrO_2$, were ballmilled with deionized water to form a slurry. A washcoat slurry was formed by adding to the slurry a lanthanum nitrate solution in an amount sufficient to form 114 grams $La_2O_3$, a neodymium nitrate solution in an amount sufficient to form 95.9 grams $Nd_2O_3$, barium oxide in an amount sufficient to form 54 grams BaO and strontium nitrate crystals in an amount sufficient to form 60 grams SrO. The slurry contained about 48% by weight of solids. A cordierite support containing about 400 flow passages per square inch of cross section ("cpsi") was dipped into the washcoat slurry. The excess was blown off the support using compressed air. After being calcined at 450° C., the resultant catalyst member contained 100 g/ft$^3$ palladium, 1.23 g/in$^3$ alumina, 0.19 g/in$^3$ $La_2O_3$, 0.1 g/in$^3$ $ZrO_2$, 0.1 g/in$^3$ strontium oxide, 1.09 g/in$^3$ BaO and 0.16 g/in$^3$ $Nd_2O_3$ and is designated catalyst member A.

EXAMPLE 2

COMPARATIVE EXAMPLE

A catalyst member was prepared using two washcoat layers of catalytic material which together have the same loadings of catalytic component described in Example 1. In this comparative example, the washcoat layers additionally contained 0.4 g/in$^3$ of a co-formed cerium oxide-zir-conium oxide composite, 0.3 g/in$^3$ of cerium oxide introduced into the slurry as cerium nitrate and 0.23 g/in$^3$ of cerium oxide introduced into the slurry as cerium nitrate and 0.23 g/in$^3$ of cerium oxide introduced as cerium hydroxide. The finished catalyst member is designated catalyst member B.

EXAMPLE 3

TESTING

Sample test cylinders measuring 1.5 inches in diameter and 3 inches in length were taken from catalyst members A and B. The axes of the cylinders were parallel to the axes of the honeycomb passages in the catalyst members. Each core was individually aged in 10% steam in air at 950° C. for 12 hours. After the aging, the catalyzed cores were evaluated using a laboratory reactor with a simulated exhaust composition (Feed Gas) under 50,000 VHSV (Gas Volume per Hour per Substrate Volume). The steady state gas composition was 0.33 mole % CO, 0.41 mole % $O_2$, 16 mole % $CO_2$, 10 mole % $H_2O$, 540 parts per million ("ppm") hydrocarbons (HC), 1,540 ppm $NO_x$, and the balance $N_2$. The perturbation composition was 0.76 mole %, 0.67 mole % $O_2$, 15.80 mole % $CO_2$, 10 mole % $H_2O$, 528 ppm HC, 1500 ppm $NO_x$, 45 ppm $SO_x$ and the balance $N_2$. HC/CO/$NO_x$ conversions were measured while the reactor temperature was gradually raised from ambient temperature to 500° C. Hydrocarbon concentration was measured using a flame ionizer detector (FID), carbon monoxide concentrations were measured using an infrared analyzer, and $NO_x$ concentration was measured using a chemluminescent analyzer. The results of light-off temperature are presented in TABLE 1. The light-off temperature is the temperature at which there is 50% conversion.

TABLE I

| LIGHT-OFF TEMPERATURES | | | |
|---|---|---|---|
| CATALYST MEMBER | HC | CO | $NO_x$ |
| A | 252° C. | 228° C. | 213° C. |
| B (Comparative) | 287 | 258 | 236 |

The results summarized in TABLE I indicate that catalyst member A has lower light-off temperature for CO, HC and $NO_x$ than the comparative catalyst member B. This indicates that a catalytic material that is free of oxygen storage component is more effective at lower temperatures than a catalytic material comprising an oxygen storage component, and so is advantageously placed in a close-coupled position, preferably in an upstream close-coupled position, for the treatment of cold-start exhaust gases.

EXAMPLE 4

A catalytic material washcoat was prepared as described in Example 1 except that barium oxide was not included. The washcoat was applied to a cordierite honeycomb-type carrier three inches in diameter by three inches in length and having 350 cpsi and the resulting catalyst member was designated catalyst member C. A comparative catalyst member was prepared in the same manner as catalyst member B, and was designated catalyst member D. Catalyst members C and D were canned and aged using 4.6 liter engine exhaust gas streams for 85 hours. The maximum engine exhaust gas temperature at the catalyst inlet was 920° C. After the aging, the catalyst members were evaluated using a 1.9 liter vehicle according to Federal Test Procedure (FTP) 1975. The results of $CO/HC/NO_x$ conversions are shown in TABLE II.

TABLE II

| CATALYST | FTP 1975 - VEHICLE TEST CONVERSION EFFICIENCIES | | |
|---|---|---|---|
| | MOLE % CONVERSION | | |
| MEMBER | CO | HC | $NO_x$ |
| C | 58.6% | 89.1% | 53.4% |
| D (Comparative) | 69% | 86.5% | 47.2% |

The results summarized in TABLE II indicate that catalyst member C had higher HC and $NO_x$ conversions and lower CO conversion than the comparative catalyst member D. The higher CO conversion of comparative catalyst member D is due to cerium oxide incorporated in the washcoat which is known to enhance CO conversion. The data of TABLE II demonstrate that by not including oxygen storage component cerium oxide in catalyst member C, the conversion reaction in the close-coupled catalyst is controlled to enable CO to pass to a downstream catalyst. Lessening CO oxidation in the close-coupled catalyst will result in lower operating temperature and greater durability since the heat of CO oxidation would exacerbate the high-temperature conditions that prevail at the upstream close-coupled position. The CO which passes to the downstream catalyst, e.g., to an underfloor catalyst, will oxidize and enable the downstream catalyst to operate at a warmer condition at the otherwise relatively cool downstream position and more effectively eliminate exhaust gas pollutants. Comparative catalyst member D is useful as an underfloor catalyst.

EXAMPLE 5

A. Preparation of Oxygen Storage Component-Free Upstream Closed-Coupled Catalytic Material Seven hundred thirty-eight grams of gamma-alumina powder having a surface area of about 160 square meters per gram (160 m²/g) were impregnated with an aqueous palladium nitrate solution containing 103.5 grams of palladium. The palladium-containing alumina and a zirconium acetate solution in an amount sufficient to form 60.1 grams of $ZrO_2$ were ballmilled with deionized water to form a slurry. A lanthanum nitrate solution was added to the slurry in an amount sufficient to form 114 grams $La_2O_3$, a neodymium nitrate solution was added to the slurry in an amount sufficient to form 95.9 grams of $Nd_2O_3$, and strontium nitrate crystals were added in an amount sufficient to form 60 grams SrO. The resulting slurry contained about 48% by weight solids. A cordierite carrier occupying 26.7 in³ and containing about 400 cpsi was dipped into the washcoat slurry, the excess was blown off the carrier using compressed air. After being calcined at 450° C., the resultant catalyzed carrier, which was cylindrical in configuration and measured 3.37 inches in diameter and 3 inches in length, had 1.78 g/in³ of catalytic material thereon, containing 300 g/ft³ palladium, 1.23 g/in³ alumina, 0.19 g/in³ $La_2O_3$, 0.1 g/in³ $ZrO_2$, 0.1 g/in³ strontium oxide, and 0.16 g/in³ $Nd_2O_3$ and was designated catalyst member E.

B. Preparation of Downstream Close-Coupled Catalytic Material

1. The First Layer

A quantity of 700 grams of gamma-alumina powder having a surface area of 160 square meters per gram (160 m²/g) was impregnated with an aqueous palladium nitrate solution containing 31.9 grams of palladium. The palladium-containing alumina, a nitric acid-stabilized colloidal dispersion of cerium oxide containing 300 grams $CeO_2$ prepared from $CeO_2$ particles about 100 Angstroms in diameter, cerium nitrate crystals in an amount sufficent to form 500 grams $Ceo_{21}$ lanthanum nitrate crystals in an amount sufficient to form 100 grams $La_2O_3$, barium acetate in an amount sufficient to form 60 grams BaO, zirconium acetate solution in an amount sufficient to form 140 grams $ZrO_2$ and 500 grams of co-formed cerium oxide-zirconium oxide powder (surface area 50 m²/g containing 20 weight percent $CeO_2$) were ballmilled with acetic acid to form a slurry. The slurry was further mixed with 70 grams of pre-milled NiO particles in deionized water to form a washcoat layering slurry containing about 48% by weight solids. A cordierite carrier containing about 400 flow passages per square inch of cross section was dipped into the washcoat slurry, the excess was blown off the carrier by compressed air. The resultant catalyzed carrier, after being calcined at 450° C., contained 55 g/in³ palladium, 0.7 g/in³ alumina, 0.8 g/in³ $CeO_2$, 0.1 g/in³ $La_2O_3$, 0.14 g/in³ $ZrO_2$, 0.06 g/in³ BaO, 0.5 g/in³ cerium oxide-zirconium oxide composite and 0.07 g/in³ NiO.

2. The Second Layer

A quantity of 700 grams of the same type of alumina powder as used in Part 1 was impregnated with a palladium nitrate solution containing 31.9 grams of palladium. The palladium-containing alumina, lanthanum nitrate crystals in an amount sufficent to form 100 grams $La_2O_3$, neodymium nitrate crystals in an amount sufficient to form 100 grams $Nd_2O_3$, zirconium nitrate crystals in an amount sufficient to form 100 grams $ZrO_2$ and strontium nitrate crystals in an amount sufficient to form 100 grams SrO, were ballmilled with deionized water to form a washcoat layering slurry which contained about 30% by weight solids. The carrier layered with the first layer in Part 1 of this catalyst was dipped into the second layer slurry. After blowing off the excess with compressed air and drying and calcining at 450° C., the carrier picked up an additional 1.13 g/in³ of washcoat containing 55 g/ft³ palladium, 0.7 g/in³ alumina, 0.1 g/in³ $La_2O_3$, 0.1 g/in³ $Nd_2O_3$, 0.1 g/in³ $ZrO_2$ and 0.1 g/in³ SrO. The final catalyzed carrier contained 110 g/in³ palladium and was designated catalyst member F.

C. Preparation of Underfloor Catalytic Material

1. The First Layer

A quantity of 700 grams of gamma-alumina powder having a surface area of 160 square meters per gram (160 m²/g) was impregnated with an aqueous palladium nitrate solution containing 37.2 grams of palladium. A quantity of 350 grams of cerium oxide-zirconium oxide composite (20% by weight of $CeO_2$) powder having a surface area of 50 square meters per gram was impregnated with an aqueous platinum amine hydroxide solution containing 0.81 grams of platinum. All 0.81 grams of platinum were impregnated. The palladium containing alumina, the platinum containing cerium oxide-zirconium oxide composite, lanthanum nitrate crystals in an amount sufficent to form 52.5 grams $La_2O_3$, neodymium nitrate crystals in an amount sufficient to form 70 grams $Nd_2O_3$, zirconium acetate solution in an amount sufficient to form 35 grams $ZrO_2$ and strontium nitrate crystals in an amount sufficient to form 175 grams SrO, were ballmilled with deionized water to form a washcoat layering slurry which contained about 45% by weight solids. A cordierite carrier containing about 400 flow passages per square inch of cross section was dipped into the washcoat slurry and the excess was blown off the carrier by compressed air. The resultant catalyzed carrier measured 4 inches in diameter, and 10 inches in length and after being calcined at 450° C., contained 91.88 $g/ft^3$ palladium, 2.0 $g/ft^3$ platinum, 1.0 $g/in^3$ alumina, 0.5 $g/in^3$ cerium oxide-zirconium oxide composite, 0.075 $g/in^3$ $La_2O_3$, 0.1 $g/in^3$ $Nd_2O_3$, 0.05 $g/in^3$ $ZrO_2$ and 0.25 $g/in^3$ SrO.

2. The Second Layer

A quantity of 600 grams of the same type cerium oxide-zirconium oxide composite powder as used in Part 1 was impregnated with an aqueous platinum amine hydroxide solution containing rhodium. The platinum and rhodium containing cerium oxide-zirconium oxide composite, a quantity of 250 grams of the same type alumina powder as used in Part A, zirconium acetate solution in an amount sufficient to form 37.5 grams $ZrO_2$ were ballmilled with deionized water to form a washcoat layering slurry which contained about 30% by weight solids. The carrier layered with the first layer in Part 1 of this catalyst was dipped into the second layer slurry. After blowing off the excess with compressed air and drying and calcining at 450° C., the carrier picked up an additional 1.78 $g/in^3$ of washcoat containing 4.56 $g/ft^3$ platinum, 6.56 $g/ft^3$ rhodium, 0.5 $g/in^3$ alumina, 1.2 $g/in^3$ cerium oxide-zirconium oxide composite, and 0.075 $g/in^3$ $ZrO_2$. The final catalyzed carrier occupied 125.6 $in^3$ and contained 91.875 $g/ft^3$ palladium, 6.56 $g/ft^3$ rhodium and 6.56 $g/ft^3$ platinum and was designated catalyst member G.

EXAMPLE 6

Catalyst members E and G were aged in engine exhaust for 75 hours at an exhaust gas temperature of 800° C.

After aging, an exhaust treatment apparatus in accordance with the present invention was assembled in which catalyst member E was placed in a first close-coupled position, catalyst member F was placed in a second close-coupled position, and catalyst member G was placed in an underfloor catalyst position. Thus, the exhaust treatment apparatus of this embodiment of the present invention comprised a first close-coupled catalyst E that was substantially free of oxygen storage components (catalyst member E) a downstream underfloor member G comprising an oxygen storage component. The apparatus was connected to a vehicle having a 2.4 liter engine, and the vehicle was subjected to Federal Testing Procedure ("FTP") 1975. The tailpipe emissions were measured, and were found to be below the California Ultra Low Emission Vehicle ("ULEV") standards, as shown in the following Table III.

TABLE III

| | NMHC* g/mile | CO g/mile | $NO_x$ g/mile |
|---|---|---|---|
| ULEV | | | |
| Maximum | 0.04 | 1.75 | 0.2 |
| Test E + G | 0.027 | 0.745 | 0.044 |

*Non-methane hydrocarbons

The data of TABLE III show that the described exhaust gas treatment apparatus according to the present invention meets the new California Air Resource Board ULEV emissions requirements.

EXAMPLE 7

Catalyst members H, I and J were prepared in the same manner as catalyst members E, F and G, respectively, of Example 6. Catalyst member H was sized to occupy 21 $in^3$, catalyst member I was sized to occupy 55 $in^3$, and catalyst member J was sixed to occupy 92 $in^3$. Prior to testing, catalyst members H and I were aged in engine exhaust for 75 hours at an exhaust gas inlet temperature of 820° C. Catalyst member J was aged for 5 hours in engine exhaust at an exhaust gas inlet temperature of 800° C. An exhaust treatment apparatus comprising catalyst members H and I as close-coupled catalysts and catalyst member J as an underfloor catalyst was installed on a vehicle having a 4.7 liter engine and was tested according to Federal Test Procedure ("FTP") 1975. The conversion results are set forth below in TABLE IV.

TABLE IV

| NMHC* % | CO % | $NO_x$ % |
|---|---|---|
| 98.3 | 97.1 | 96.2 |

*Non-methane Hydrocarbons

The data of TABLE IV show that even after aging, the apparatus comprising catalyst members H, I and J provided sufficient conversion activity for a typical vehicle emitting 2.0 g/mile hydrocarbons, 10 g/mile carbon monoxide, and 3 g/mile $NO_x$ to meet stringent CARB standards.

While the invention has been described in detail with reference to particular embodiments thereof, it will be apparent that upon a reading and understanding of the foregoing, numerous alterations to the described embodiments will occur to those skilled in the art and it is intended to include such alterations within the scope of the appended claims.

What is claimed is:

1. An engine exhaust treatment apparatus for abating pollutants contained in the exhaust stream of the engine, the apparatus defining a flow path for the exhaust stream and comprising:

(a) an upstream catalyst member comprising an upstream catalytic material effective for catalyzing the oxidation of hydrocarbons and comprising a platinum group metal component dispersed on a refractory metal oxide first support, the upstream catalyst being substantially free of oxygen storage components; and (b) a downstream catalyst member comprising a downstream catalytic material effective at least for the oxidation of hydrocarbons and comprising one or more catalytic metal components dispersed on a refractory metal oxide support and further comprising an oxygen storage component.

2. The apparatus of claim 1 wherein the upstream catalyst member comprises a first close-coupled catalyst member and wherein the platinum group metal component of the upstream catalytic material comprises a palladium component.

3. The apparatus of claim 2 wherein the downstream catalytic material comprises a rhodium component.

4. The apparatus of claim 3 wherein the upstream catalytic material is substantially free of rhodium.

5. The apparatus of claim 2 wherein the downstream catalyst member comprises an underfloor catalyst member.

6. The apparatus of claim 1 or claim 2 wherein the downstream catalyst member comprises a second close-coupled catalyst member and wherein the downstream catalytic material comprises a palladium component and an oxygen storage component.

7. The apparatus of claim 6 further comprising an underfloor catalyst member comprising a three-way catalytic material.

8. The apparatus of claim 7 wherein the first close-coupled catalyst member and the second close-coupled catalyst member have different cross-sectional dimensions and are disposed within separate canisters.

9. The apparatus of claim 7 wherein the first close-coupled catalyst member and the second close-coupled catalyst member have like cross-sectional dimensions and are disposed within the same canister.

10. The apparatus of claim 7 wherein the first and the second catalyst members each comprise a catalytic material comprising palladium and wherein the three-way catalytic material of the underfloor catalyst member comprises rhodium.

11. The apparatus of claim 1 or claim 2 wherein the upstream catalytic material comprises at least one rare earth metal oxide selected from the group consisting of neodymium oxide and lanthanum oxide.

12. An engine exhaust treatment apparatus for abating pollutants contained in the exhaust stream of the engine, the apparatus defining a flow path for the exhaust stream and comprising:
(a) a first close-coupled catalyst member comprising a first catalytic material effective for catalyzing the oxidation of hydrocarbons and comprising a palladium catalytic component dispersed on a refractory metal oxide first support, the first catalytic material being substantially free of rhodium and oxygen storage components;
(b) a second close-coupled catalyst member comprising a second catalytic material effective at least for the oxidation of hydrocarbons; and
(c) an underfloor catalyst member comprising a third catalytic material effective for three-way abatement of pollutants;
wherein at least one of the second close-coupled downstream catalyst member and the underfloor member comprise an oxygen storage component.

13. The apparatus of claim 12 wherein the first catalytic material comprises at least one of an alkaline earth metal oxide, a rare earth metal oxide other than cerium oxide or praseodymium oxide, and zirconium oxide.

14. The apparatus of claim 12 wherein the first close-coupled catalyst member comprises from about 0.5 to about 3.5 g/in$^3$ of activated alumina and at least about 50 g/ft$^3$ of palladium component calculated as palladium metal and from about 0.05 to about 0.5 g/in$^3$ of the at least one alkaline earth metal component, calculated as the oxide.

15. The apparatus of claim 14 wherein the first close-coupled catalyst member comprises from about 0.05 g/in$^3$ to about 0.4 g/in$^3$ of strontium oxide;

not more than about 0.5 g/in$^3$ of zirconium oxide incorporated into the support material; and
not more than about 0.5 g/in$^3$ of at least one rare earth metal oxide selected from the group consisting of lanthanum oxide and neodymium oxide.

16. The apparatus of claim 15 wherein the first close-coupled catalyst member comprises at least 60 g/ft$^3$ of a platinum group metal component and wherein the platinum group metal component principally comprises a palladium component.

17. The apparatus of claim 15 wherein the first close-coupled catalyst member comprises from about 75 to about 300 g/ft$^3$ of the platinum group metal component.

18. The apparatus of claim 16 wherein the first close-coupled catalyst member comprises from about 0.75 to about 2.0 g/in$^3$ of activated alumina support material; and at least one component selected from the group consisting of:
from about 0.05 to about 0.4 g/in$^3$ of strontium oxide;
from about 0.05 to about 0.2 g/in$^3$ of barium oxide;
from about 0.025 to about 0.3 g/in$^3$ of lanthanum oxide;
from about 0.025 to about 0.3 g/in$^3$ of neodymium oxide; and
from about 0.05 to about 0.5 g/in$^3$ of zirconium oxide.

19. The apparatus of claims 14, 15 or 16 wherein the first close-coupled catalyst member comprises about 300 g/ft$^3$ palladium, 1.23 g/in$^3$ alumina, 0.19 g/in$^3$ lanthanum oxide, 0.1 g/in$^3$ zirconium oxide, 0.1 g/in$^3$ strontium oxide and 0.16 g/in$^3$ neodymiun oxide; and
wherein the second close-coupled catalyst member comprises about 110 g/ft$^3$ palladium, 1.4 g/in$^3$ alumina, 0.8 g/in$^3$ cerium oxide, 0.5 g/in$^3$ cerium oxide-zirconium oxide composite, 0.24 g/in$^3$ zirconium oxide, 0.2 g/in$^3$ lanthanum oxide, 0.1 g/in$^3$ neodymium oxide, 0.1 g/in$^3$ strontium oxide, 0.07 g/in$^3$ nickel oxide and 0.06 g/in$^3$ barium oxide; and
wherein the underfloor catalyst comprising about 91.9 g/ft$^3$ palladium, 6.56 g/ft$^3$ rhodium, 6.56 g/ft$^3$ platinum, 1.5 g/in$^3$ alumina, 1.7 g/in$^3$ cerium oxide-zirconium oxide composite, 0.1 g/in$^3$ neodymium oxide, 0.25 g/in$^3$ strontium oxide, 0.125 g/in$^3$ zirconium oxide, and 0.075 g/in$^3$ lanthanum oxide.

20. A method for treating the exhaust of an engine having an exhaust gas outlet, the method comprising flowing the exhaust gas from the exhaust gas outlet of the engine to an upstream catalyst member comprising an upstream catalytic material effective at least for the oxidation of hydrocarbons and comprising a platinum group metal component dispersed on a refractory inorganic oxide support, the upstream catalytic material being substantially free of oxygen storage components, and then flowing the exhaust gas to at least one catalyst member downstream of the upstream catalyst member, the at least one downstream catalyst member comprising a downstream catalytic material effective at least for the oxidation of hydrocarbons comprising at least one oxygen storage component.

21. The method of claim 20 wherein the upstream catalyst is a close-coupled catalyst, comprising converting at least 10% of the carbon monoxide in the exhaust over the at least one downstream catalyst.

22. The method of claim 21 comprising converting at least 25% of the carbon monoxide in the exhaust over the at least one downstream catalyst.

23. The method of claim 21 comprising converting at least 30% of the carbon monoxide in the exhaust over the at least one downstream catalyst.

24. The method of claim 21 comprising converting at least 40% of the carbon monoxide in the exhaust over the at least one downstream catalyst.

25. The apparatus of claim 11 wherein the upstream catalyst material comprises neodymium oxide.

26. A method for treating the exhaust of an engine having an exhaust gas outlet, comprising flowing the exhaust gas from the outlet to an engine exhaust treatment apparatus as defined in claim 6.

27. A method for treating the exhaust of an engine having an exhaust gas outlet, comprising flowing the exhaust gas from the outlet to an engine exhaust treatment apparatus as defined in claim 11.

28. The method of claim 27 wherein the platinum group metal component of the upstream catalytic material comprises a palladium component.

\* \* \* \* \*